United States Patent [19]

Woodcock

[11] 4,420,993
[45] Dec. 20, 1983

[54] SHIFT INHIBITOR ASSEMBLY

[75] Inventor: Stewart J. Woodcock, Fayetteville, N.Y.

[73] Assignee: Chrysler Corporation, Highland Park, Mich.

[21] Appl. No.: 278,805

[22] Filed: Jun. 29, 1981

[51] Int. Cl.³ .................... F16H 57/06; F16D 13/60
[52] U.S. Cl. .................... 74/785; 192/114 R; 192/114 T
[58] Field of Search .................. 74/785; 192/105 CF, 192/114 T, 114 R

[56] References Cited

U.S. PATENT DOCUMENTS

| | | | |
|---|---|---|---|
| 1,358,695 | 11/1920 | Richardson et al. | 192/114 |
| 4,103,753 | 8/1978 | Holdeman | 74/785 |
| 4,347,762 | 9/1982 | Holdeman | 74/785 |

Primary Examiner—Leslie A. Braun
Assistant Examiner—D. Wright
Attorney, Agent, or Firm—Newtson and Dundas

[57] ABSTRACT

A power transmission having a planetary gear set in which ratio changes are effected by sliding the carrier and ring gear of the gear set axially with respect to the input shaft, output shaft, and housing includes a plurality of flyweight actuators mounted on the carrier to effect an axial lock-up with the output shaft at speeds above a predetermined speed.

1 Claim, 4 Drawing Figures

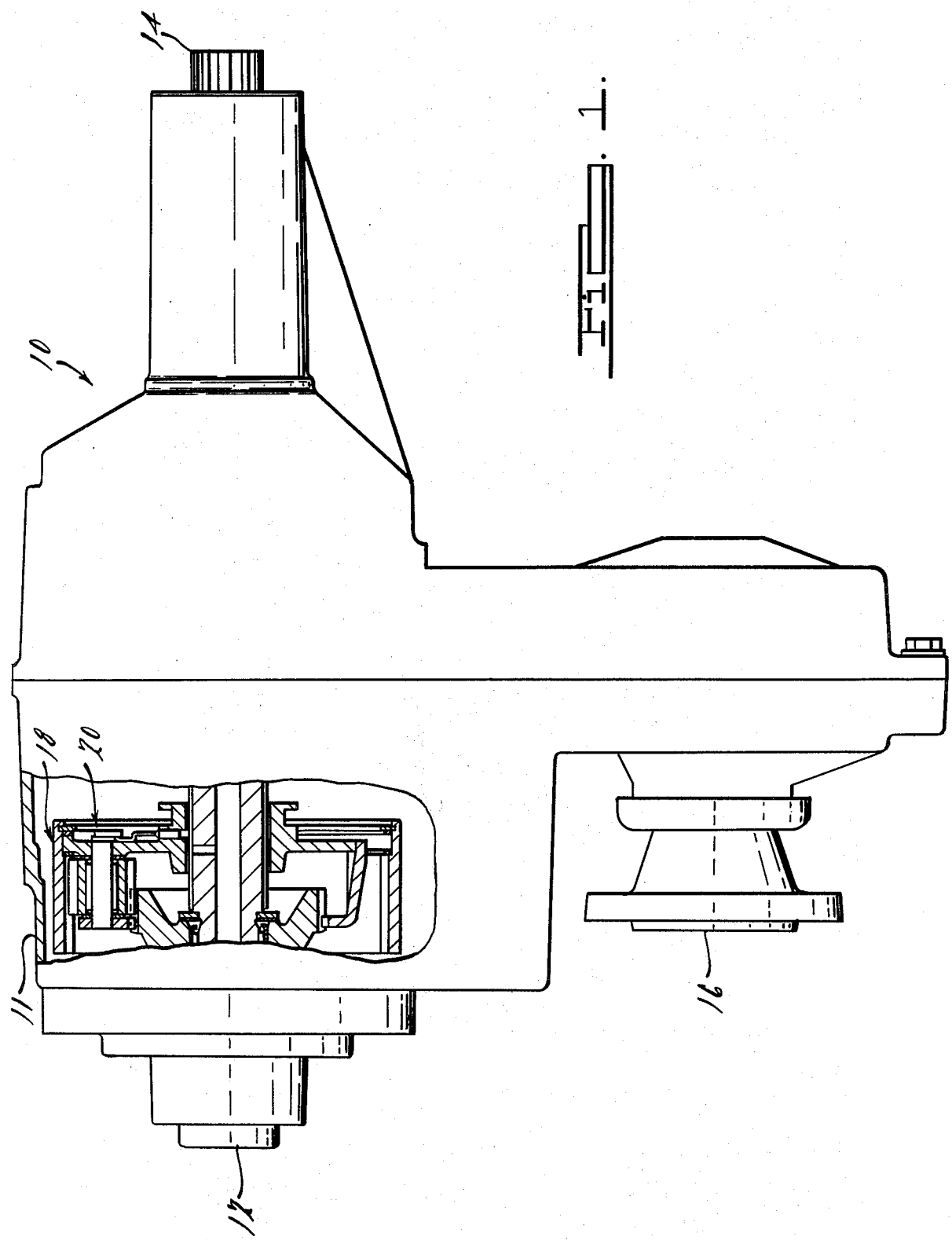

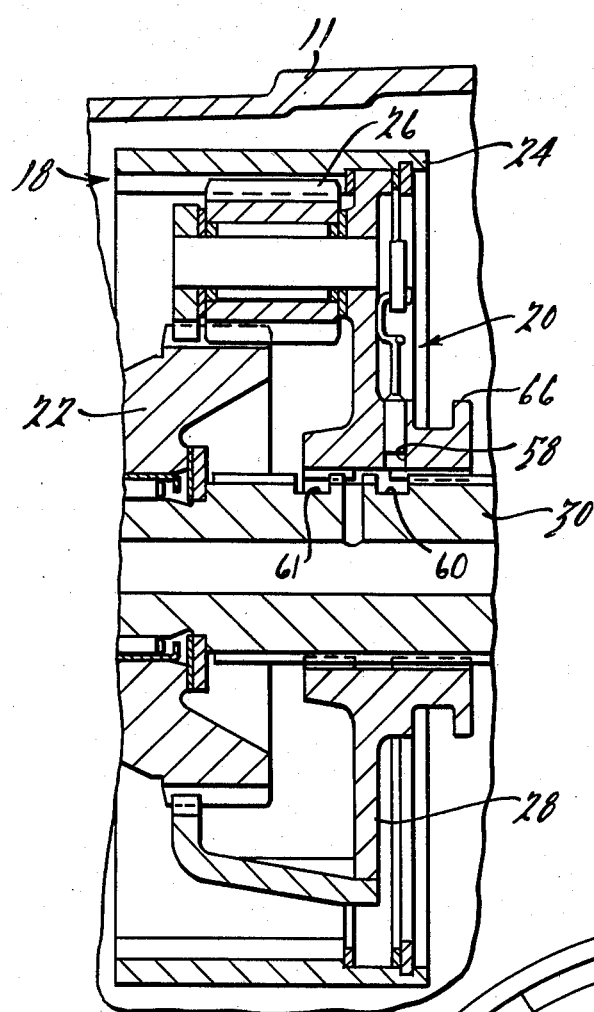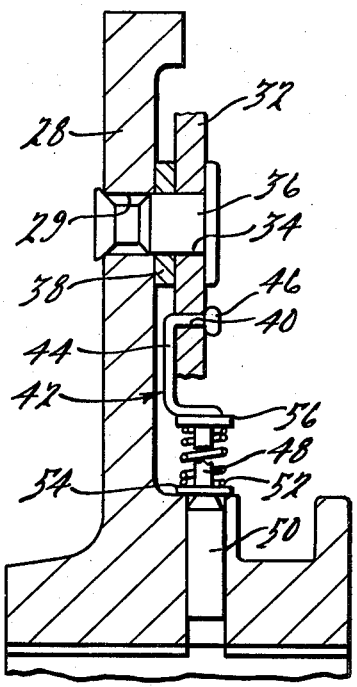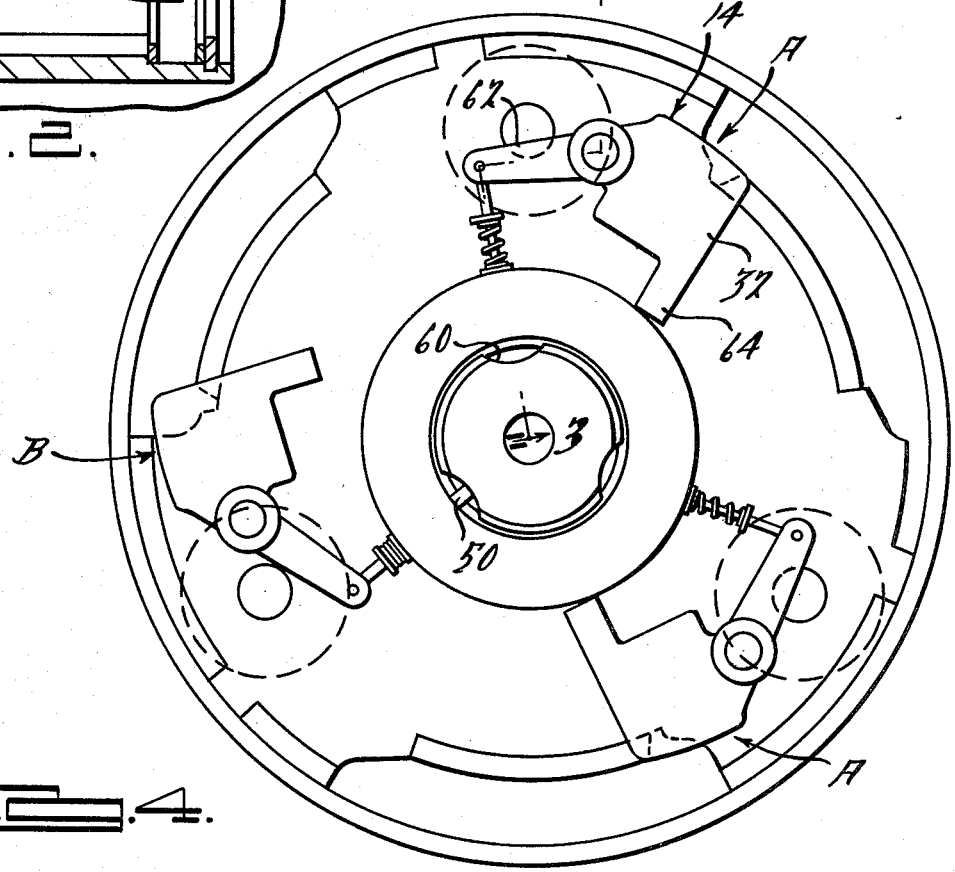

4,420,993

SHIFT INHIBITOR ASSEMBLY

BACKGROUND OF THE INVENTION

This invention relates generally to power transmissions employing axially shiftable planetary gear sets and more specifically to shift inhibitors therefor.

Simple planetary transmissions such as are employed in four wheel drive transfer cases and which provide means for effecting gear ratio changes by selectively axially shifting elements of the planetary gear set are well known in the art. Exemplary of such transmissions is that shown in U.S. Pat. No. 4,103,753.

Since the limited purpose for which such transmissions are used in multi-ratio applications has not justified design of a complex, expensive synchronized gear shifting, care must be taken in their use to avoid shifting at high speeds to avoid damage to gear components.

SUMMARY OF THE INVENTION

To prevent the undesirable high speed shifting in such transmissions without unduly complicating the design or making it excessively expensive, the present invention provides a simple mechanical means for inhibiting shifts above a predetermined speed.

Speed responsive flyweight actuator members are mounted on the planet carrier of the transmission which are urged by centrifugal force to mechanically engage pockets formed in the transmission's output shaft at axial positions corresponding to desired positions of the axially shifting members.

BRIEF DESCRIPTION OF THE DRAWINGS

The objects and advantages of this invention will become apparent to those skilled in the art upon reading of the following specification with reference to the accompanying drawing figures in which:

FIG. 1 is a partially cross sectioned side view of a transfer case embodying the shift inhibitor of the present invention;

FIG. 2 is an enlarged cross sectional view of the planetary gear set of FIG. 1;

FIG. 3 is an enlarged cross sectional view of the invention shift inhibitor taken along line 3—3 of FIG. 4; and FIG. 4 is an end view of the planetary gear set and shift inhibitor assembly of FIG. 2.

DESCRIPTION OF THE PREFERRED EMBODIMENT

Turning now to the drawings and in particular to FIG. 1 there is illustrated a transfer case 10 of the type employed to transmit power from the engine of a vehicle to its front and rear wheels. The transfer case 10 is illustrated as including a housing assembly 11 for mounting in the vehicle, input drive shaft means 12 adapted to be connected to the vehicle power source, as through a transmission, rear output shaft means 14 for transmitting power to the rear wheels of the vehicle, and front output shaft means 16 for transmitting power to the front wheels of the vehicle.

In the cut-away portion of FIG. 1 the transfer case 10 is illustrated as comprising a planetary gear set 18 which includes a shift inhibitor assembly 20. It will be appreciated by those skilled in the art that the description of the particular planetary gear set 18 disclosed here and its shift inhibitor assembly 20 in the described transfer case environment is made for illustrative purposes only and is not meant to limit the present invention.

The planetary gear set 18 is of the type in which gear ratio changes are effected through axial shifting of components thereof or of components operatively associated therewith. The gear set 18, as may best be seen in FIG. 2, includes generally a sun gear 22, an annulus or ring gear 24, a plurality of planet gears 26 (one shown) and a carrier member 28. In operation the planet gears mesh with both the sun gear 22 which is driven by the input shaft means 12 and the ring gear 24 and are conventionally rotatably mounted on the carrier 28 which is drivingly engaged with the transfer case mainshaft portion 30 of the output shaft means 14. In the embodiment illustrated the carrier 28 may also effect gear meshing engagement with the sun gear 22 as shown in FIG. 2 and carrier 28 and ring gear 24 are axially rigidly connected to permit axially shifting of the resulting assembly with respect to the sun gear 22 and the housing 11 to permit gear ratio changes. For example, in the position shown in FIG. 2 the sun gear 22 and the main shaft 30 are directly locked together through the carrier 28 to effect direct drive. Leftward movement of carrier 28 and annulus 24 to a position wherein the carrier 28 is free from the sun gear 22 will effect a neutral or nondriving condition and further leftward movement to a position wherein the annulus 24 is grounded to the housing 11 will effect torque multiplication and speed reduction through the planetary gear set 18.

The shift inhibitor assembly 20 of the present invention operates to prevent shifting axial movement of the carrier 28 and annulus 24 when portions of the gear set are operating at speeds above a predetermined speed to prevent component damage since no gear synchronization is provided.

Turning now to FIGS. 3 and 4 the shift inhibitor assembly 20 is illustrated in its cooperative association with the carrier member 28 and the main shaft 30 whereby shift inhibiting operation is accomplished.

A plurality (three shown in the preferred embodiment) of inhibitor plates or flyweights 32 each include a mounting bore 34 for receiving a mounting fastener such as the rivet 36 shown in FIG. 3. A rivet receiving bore 29 is provided in the carrier member 28 for each rivet 36 in circumferentially spaced relationship as shown in FIG. 4. Insertion of the rivets 36 through the bores 34 and 29 and washers 38 and axially retaining deformation of the rivets 36 is accomplished to effect retaining of the inhibitor plates 32 for rotation with the carrier member 28 while permitting pivotal movement of the inhibitor plates 32 with respect to the rivets 36.

As can best be seen in FIG. 3, each inhibitor plate 32 includes a through bore 40 for carrying an actuation rod 42. The rod 42 includes a generally C-shaped hook portion 44 terminating in a retaining enlargement 46 for attachment to the inhibitor plate 32 at the through bore 40. The rod 42 further includes a straight, radially inwardly extending plug carrying portion 48 which is fixedly secured as through press fit insertion, welding, or the like to a smooth, cylindrical plug member 50. Carried about the plug carrying portion 48 is a spring member 52 seated between washers 54,56 as may best be seen in FIG. 3.

The plug member 50 is slidably received in a radially extending bore 58 in a hub portion of the carrier member 28. Pockets 60,61 are formed in the outer periphery of main shaft 30 which register with the bore 58 in the operative axial positions.

Turning finally to FIG. 4 the operation of the present invention can be understood by reference to the two operational portions of the inhibitor plate 32, the free and locked positions, designated by the reference letters "A" and "B", respectively. The inhibitor plate 32 is an unbalanced member pivotally connected to the carrier member 28 as before described. It includes an actuation arm 62 extending in a counterclockwise direction as viewed in FIG. 4 for attachment to the rod member 44. It also includes a generally radially inwardly extending stop portion 64 which is urged into contact with an outer diametral surface 66 of carrier member 28.

When the main shaft 30 is at rest or at a speed below some low predetermined speed, the spring 52 operates to urge the inhibitor plate 32 to pivot in the clockwise direction to urge the plate 32 to the stop position shown at "A". When in this position the plug member 50 is withdrawn, preferably within the bore 58 as shown in FIG. 3. The carrier member 28 (together with the ring gear 24 in the preferred embodiment) may then be freely shifted axially to the desired operative position. Upon increasing the speed of the main shaft 30 in a counterclockwise direction as viewed in FIG. 5, above a predetermined minimum, centrifugal force operates on the unbalanced inhibitor plate 32 to effect pivotal movement of the plate 32 toward the position shown at "B" in which the plug 50 is inserted into a pocket 60 or 61, thereby preventing axial shifting of the carrier 28.

While only one embodiment has been described those skilled in the art will appreciate that others may be possible without departing from the scope of the following claims:

What is claimed is:

1. In a power transmission having a housing, an input shaft, an output shaft, and a planetary gear assembly disposed operatively therebetween, the planetary gear assembly including a sun gear in driven relationship with the input shaft, and a sub-assembly, said sub-assembly having a carrier, a ring gear, and planet gear means in meshing relationship with the sun and ring gears, said sub-assembly being shiftable relative to said sun gear along said output shaft for effecting gear ratio changes, the improvement comprising shift inhibitor means operatively associated with said gear assembly for preventing axial movement of said gear sub-assembly when said output shaft is rotating at a speed above a predetermined speed; said shift inhibitor means including a plurality of speed responsive flyweight actuator members mounted for rotation with said carrier; means defining a plurality of axially spaced sets of axially aligned pockets in the outer periphery of said output shaft; means defining an axially extending hub portion of said carrier having a plurality of radially extending bores formed therethrough; each said actuator members pivotally mounted on said carrier for reciprocal movement with respect thereto at a position spaced radially outwardly from said hub portion; and a plurality of radially extending actuating rod members, each rod member pivotally connected to one of an associated actuator members for movement therewith in response to centrifugal force exerted on its actuator member, each said rod member including a cylindrical plug portion insertable through an associated one of the carrier member bores to engage a pocket when the speed of said output shaft exceeds said predetermined speed, a plurality of biasing helical compression springs, each said spring oriented on the radial axis of its associated rod member, each said spring engaged between a portion of its associated rod member and said hub portion for continuously biasing said actuator member radially outwardly, thereby insuring disengagement of said plug portions from said pockets at speeds below said predetermined speed.

* * * * *